(12) United States Patent
Zaman et al.

(10) Patent No.: US 9,256,829 B2
(45) Date of Patent: *Feb. 9, 2016

(54) INFORMATION PROPAGATION PROBABILITY FOR A SOCIAL NETWORK

(71) Applicant: Microsoft Technology Licensing, LLC, Redmond, WA (US)

(72) Inventors: Tauhid Rashed Zaman, Brookline, MA (US); Jurgen Anne Francois Marie Van Gael, Cambridge (GB); David Stern, Cambridge (GB); Ralf Herbrich, Cambridge (GB); Gilad Lotan, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/599,995

(22) Filed: Jan. 19, 2015

(65) Prior Publication Data

US 2015/0134579 A1    May 14, 2015

Related U.S. Application Data

(63) Continuation of application No. 13/919,088, filed on Jun. 17, 2013, now Pat. No. 8,938,407, which is a continuation of application No. 12/971,191, filed on Dec. 17, 2010, now Pat. No. 8,473,437.

(51) Int. Cl.

| | |
|---|---|
| *G06F 15/18* | (2006.01) |
| *G06N 5/04* | (2006.01) |
| *G06Q 30/02* | (2012.01) |
| *G06N 99/00* | (2010.01) |
| *H04L 12/26* | (2006.01) |
| *H04L 12/58* | (2006.01) |

(52) U.S. Cl.
CPC ............... *G06N 5/04* (2013.01); *G06N 99/005* (2013.01); *G06Q 30/02* (2013.01); *H04L 43/08* (2013.01); *H04L 51/32* (2013.01)

(58) Field of Classification Search
None
See application file for complete search history.

(56) References Cited

U.S. PATENT DOCUMENTS

| | | |
|---|---|---|
| 5,704,017 A | 12/1997 | Heckerman et al. |
| 5,790,935 A | 8/1998 | Payton |
| 6,029,161 A | 2/2000 | Lang et al. |

(Continued)

OTHER PUBLICATIONS

Role of Sentiment in Message Propagation: Reply vs. Retweet Behavior in Political Communication Jihie Kim; Jaebong Yoo Social Informatics (SocialInformatics), 2012 International Conference on Year: 2012 pp. 131-136, DOI: 10.1109/SocialInformatics.2012.33 Referenced in: IEEE Conference Publications.*

(Continued)

*Primary Examiner* — Michael B Holmes
(74) *Attorney, Agent, or Firm* — Steve Wight; Sandy Swain; Micky Minhas

(57) ABSTRACT

One or more techniques and/or systems are disclosed for predicting propagation of a message on a social network. A predictive model is trained to determine a probability of propagation of information on the social network using both positive and negative information propagation feedback, which may be collected while monitoring the social network over a desired period of time for information propagation. A particular message can be input to the predictive model, which can determine a probability of propagation of the message on the social network, such as how many connections may receive at least a portion of the message and/or a likelihood of at least a portion of the message reaching respective connections in the social network.

20 Claims, 7 Drawing Sheets

(56) References Cited

U.S. PATENT DOCUMENTS

| | | | |
|---|---|---|---|
| 6,041,311 A | 3/2000 | Chislenko et al. | |
| 6,049,777 A | 4/2000 | Sheena et al. | |
| 6,064,980 A | 5/2000 | Jacobi et al. | |
| 6,321,170 B1 | 11/2001 | Wurgler et al. | |
| 6,412,012 B1 | 6/2002 | Bieganski et al. | |
| 6,633,852 B1 | 10/2003 | Heckerman et al. | |
| 6,850,252 B1 | 2/2005 | Hoffberg | |
| 6,865,546 B1 | 3/2005 | Song | |
| 6,868,525 B1 | 3/2005 | Szabo | |
| 7,050,868 B1 | 5/2006 | Graepel et al. | |
| 7,096,208 B2 | 8/2006 | Zaragoza et al. | |
| 7,167,849 B2 | 1/2007 | Graepel et al. | |
| 7,246,103 B2 | 7/2007 | Herbrich et al. | |
| 7,260,560 B2 | 8/2007 | Herbrich et al. | |
| 7,310,626 B2 | 12/2007 | Scarborough et al. | |
| 7,359,550 B2 | 4/2008 | Brand | |
| 7,376,474 B2 | 5/2008 | Graepel et al. | |
| 7,389,201 B2 | 6/2008 | Chickering et al. | |
| 7,480,640 B1 | 1/2009 | Elad et al. | |
| 7,574,422 B2 | 8/2009 | Guan et al. | |
| 7,584,171 B2 | 9/2009 | Guan et al. | |
| 7,590,616 B2 | 9/2009 | Guan et al. | |
| 7,596,538 B1 | 9/2009 | Owen et al. | |
| 7,647,289 B2 | 1/2010 | Graepel et al. | |
| 7,702,482 B2 | 4/2010 | Graepel et al. | |
| 7,840,986 B2 | 11/2010 | Ali et al. | |
| 7,953,676 B2 | 5/2011 | Agarawal et al. | |
| 8,204,838 B2 | 6/2012 | Schwaighofer et al. | |
| 8,332,512 B1 | 12/2012 | Wu et al. | |
| 8,364,612 B2 | 1/2013 | Van Gael et al. | |
| 8,417,650 B2 | 4/2013 | Graepel et al. | |
| 8,433,660 B2 * | 4/2013 | Stern | G06Q 10/00 706/12 |
| 8,473,437 B2 * | 6/2013 | Zaman | G06Q 30/02 706/21 |
| 8,538,910 B2 | 9/2013 | Minka et al. | |
| 8,560,528 B2 * | 10/2013 | Herbrich | G06F 17/30525 707/722 |
| 8,583,266 B2 | 11/2013 | Herbrich et al. | |
| 8,589,317 B2 * | 11/2013 | Paquet | G06N 3/08 706/12 |
| 8,645,298 B2 * | 2/2014 | Hennig | G06N 7/005 706/12 |
| 8,706,653 B2 | 4/2014 | Kasneci et al. | |
| 8,725,858 B1 | 5/2014 | Wu et al. | |
| 8,781,915 B2 * | 7/2014 | Herbrich | G06Q 30/02 705/26.7 |
| 8,788,578 B2 * | 7/2014 | Wood | H04L 65/4069 463/42 |
| 8,938,407 B2 * | 1/2015 | Zaman | G06Q 30/02 706/12 |
| 2002/0174429 A1 | 11/2002 | Gutta et al. | |
| 2002/0199186 A1 | 12/2002 | Ali et al. | |
| 2003/0234812 A1 | 12/2003 | Drucker et al. | |
| 2004/0054572 A1 | 3/2004 | Oldale et al. | |
| 2004/0083195 A1 | 4/2004 | McCord et al. | |
| 2004/0103058 A1 | 5/2004 | Hamilton | |
| 2005/0193002 A1 | 9/2005 | Souders et al. | |
| 2007/0078849 A1 | 4/2007 | Slothouber | |
| 2007/0150428 A1 | 6/2007 | Webb | |
| 2007/0288413 A1 | 12/2007 | Mizuno et al. | |
| 2008/0005072 A1 | 1/2008 | Meek et al. | |
| 2008/0097821 A1 | 4/2008 | Chickering et al. | |
| 2008/0120288 A1 | 5/2008 | Guan et al. | |
| 2008/0126303 A1 | 5/2008 | Park et al. | |
| 2008/0177726 A1 | 7/2008 | Forbes et al. | |
| 2008/0215411 A1 | 9/2008 | Hu et al. | |
| 2009/0204234 A1 | 8/2009 | Sustaeta et al. | |
| 2009/0228296 A1 | 9/2009 | Ismalon | |
| 2009/0319288 A1 | 12/2009 | Slaney et al. | |
| 2010/0030578 A1 | 2/2010 | Siddique et al. | |
| 2010/0100416 A1 | 4/2010 | Herbrich et al. | |
| 2011/0061076 A1 | 3/2011 | Ali et al. | |
| 2015/0012378 A1 | 1/2015 | Herbrich et al. | |

OTHER PUBLICATIONS

Statistically Modeling the Effectiveness of Disaster Information in Social Media Jiang Zhu; Fei Xiong; Dongzhen Piao; Yun Liu; Ying Zhang Global Humanitarian Technology Conference (GHTC), 2011 IEEE Year: 2011 pp. 431-436, DOI: 10.1109/GHTC.2011.48 Referenced in: IEEE Conference Publications.*

Bennett et al., "The Netflix Prize", Proceedings of KDD Cup and Workshop, Aug. 12, 2007, 4 pages.

Bielinska, Ewa M., "Minimum Variance Prediction of Bilinear Time Series: Direct and Adaptive Versions," Journal of Forecasting, vol. 12, No. 6, Aug. 1993, pp. 459-480, 22 pages.

Billsus et al., "Adaptive News Access," The Adaptive Web, LNCS 4321, 2007, pp. 550-570, 21 pages.

Breese et al., "Empirical Analysis of Predictive Algorithms for Collaborative Filtering", Proceedings of the 14th ACM Conference on Uncertainty in Artificial Intelligence, 1998, pp. 43-52, 10 pages.

Breese et al., "Empirical Analysis of Predictive Filtering Algorithms for Collaborative Filtering," Microsoft Research, Technical Report, MSR-TR-98-12, May 1998, 19 pages.

Breese et al., "Empirical Analysis of Predictive Filtering Algorithms for Collaborative Filtering," Microsoft Research, Technical Report, MSR-TR-98-12, revised Oct. 1998, 21 pages.

Chee, Sonny Han Seng, "RecTree: A Linear Collaborative Filtering Algorithm," Thesis written 1992, Simon Fraser University, Sep. 2000, 119 pages.

Chen, Annie, "Context-Aware Collaborative Filtering System: Predicting the User's Preference in the Ubiquitous Computing Environment", retrieved on Aug. 22, 2008 at <<http://www.ibao.net/papers/cacf-loca05.pdf>>, Springer-Verlag Berlin Heidelberg, LNCS 3479, 2005, pp. 244-253, 10 pages.

Chu et al., "Gaussian Processes for Ordinal Regression", retrieved on Oct. 13, 2009 at <<http://learning.eng.cam.ac.uk/zoubin/papers/chu05a.pdf>>, Journal of Machine Learning Research, vol. 6, Submitted Nov. 2004, Revised Mar. 2005, Published Jul. 2005, pp. 1019-1041, 23 pages.

Chu et al., "Personalized Recommendation on Dynamic Content Using Predictive Bilinear Models," ACM WWW 2009, Social Networks and Web 2.0, Recommender Systems, Apr. 20-24, 2009, Madrid, Spain, 10 pages.

Claypool et al., "Inferring User Interest," Computer Science Technical Report Series, Worcester Polytechnic Institute, May 2001, 24 pages.

Dangauthier et al., "TrueSkill Through Time: Revisiting the History of Chess", Advances in Neural Information Processing Systems 20, 2008, pp. 1-8 (337-344), 8 pages.

Das et al., "Google News Personalization: Scalable Online Collaborative Filtering," ACM WWW2007 Industrial Practice and Experience, May 8-12, 2007, Banff, Alberta, Canada, 10 pages.

Fan et al., "An Analytical Model for the Propagation of Social Influence," Proceedings of the IEEE/WIC/ACM International Joint Conferences on Web Intelligence (WI) and Intelligent Agent Technologies (IAT), vol. 1, 2013, pp. 1-8, 8 pages.

Goldberg et al, "Using Collaborative Filtering to Weave an Information Tapestry", Communications of the ACM, vol. 35, No. 12, 1992, pp. 61-70, 10 pages.

Gomes et al., "Algorithm Portfolio Design: Theory vs. Practice", retrieved on Oct. 13, 2009 at <<http://www.cs.cornell.edu/selman/papers/pdf/97.uai.algorithm.pdf>>, Proceedings of the Thirteenth Conference on Uncertainty in Artificial Intelligence, 1997, pp. 190-197, 8 pages.

Gomes et al., "Heavy-Tailed Phenomena in Satisfiability and Constraint Satisfaction Problems", retrieved on Oct. 13, 2009 at <<http://www.cs.cornell.edu/gomes/jar.pdf>>, Kluwer Academic Publishers, Netherlands, Journal of Automated Reasoning, vol. 24, 2000, pp. 67-100, 34 pages.

Good et al., "Combining Collaborative Filtering with Personal Agents for Better Recommendations", retrieved on Aug. 22, 2008 at <<http://www.cs.ubc.ca/~conati/532b/papers/good-konstan-aaai-99.pdf>>, American Assocation for Artificial Intelligence, 1999, 8 pages.

Gossen, Andrew, "7 Things to Know About Facebook's Open Graph: Guest Blogger Andrew Gossen," Alumni Futures, May 10, 2010, 5 pages.

(56) References Cited

OTHER PUBLICATIONS

Horvitz et al., "A Bayesian Approach to Tackling Hard Computational Problems", retrieved on Oct. 13, 2009 at <<ftp://ftp.research.microsoft.com/pub/ejh/uai2k1.pdf>>, Morgan Kaufmann Publishers: San Francisco, Proceedings of the Seventeenth Conference on Uncertainty and Artificial Intelligence, Aug. 2001, pp. 1-10, 10 pages.
Stern et al., "Matchbox: Large Scale Online Bayesian Recommendations," Proceedings of the 18th International Conference on World Wide Web, ACM, 2009, pp. 111-120, 10 pages.
Streeter et al., "New Techniques for Algorithm Portfolio Design", retrieved on Oct. 13, 2009 at <<http://uai2008.cs.helsinki.fi/UAI—camera—ready/streeter.pdf>>, The Robotics Institute Carnegie Mellon University, pp. 1-9, 9 pages.
Wang et al., "Probabilistics Relevance Ranking for Collaborative Filtering," Information Retrieval, vol. 11, No. 6, 2008, 27 pages.
Watanabe et al., "Improvement of Collaborative Filtering Based on Fuzzy Reasoning Model," 2006 IEEE International Conference on Systems, Man and Cybernetics, Oct. 8-11, 2006, pp. 4790-4795, 6 pages.
Winn, John M., "Variational Message Passing and its Applications", PhD thesis, Department of Physics, University of Cambridge, 2003, pp. ii-xii, 13 pages.
Xu et al., "SATzilla: Portfolio-based Algorithm Selection for SAT", retrieved on Oct. 13, 2009 at <<http://www.aaai.org/Papers/JAIR/Vol32/JAIR-3214.pdf>>, Journal of Artificial Intelligence Research, vol. 32, Jun. 2008, pp. 565-606, 42 pages.
Zhang et al., "Information Propagation in Microblog Networks," Proceedings of the 2013 IEEE/ACM International Conference on Advances in Social Networks Analysis and Mining (ASONAM), 2013, pp. 190-196, 7 pages.
Zou et al., "On Top-N Recommendation Using Implicit User Preference Propagation Over Social Networks," Communications (ICC), 2014 IEEE International Conference, Jun. 10-14, 2014, pp. 3919-3924, 6 pages.
Zuckerberg, Mark, "The Facebook Blog-Building the Social Web Together", Published Apr. 21, 2010, retrieved at <<htt;://blog.facebook.com/blog.php?post=383404517130 on Sep. 28, 2010, 3 pages.
Non-Final Office Action mailed Oct. 10, 2013 from U.S. Appl. No. 13/919,088, 12 pages.
Terminal Disclaimer filed Jan. 10, 2014 from U.S. Appl. No. 13/919,088, 2 pages.
Response filed Jan. 10, 2014 to Non-Final Office Action dated Oct. 10, 2013 from U.S. Appl. No. 13/919,088, 6 pages.
Non-Final Office Action mailed Feb. 11, 2014 from U.S. Appl. No. 13/919,088, 12 pages.
Terminal Disclaimer filed May 12, 2014 from U.S. Appl. No. 13/919,088, 2 pages.
Response filed May 12, 2014 to Non-Final Office Action dated Feb. 11, 2014 from U.S. Appl. No. 13/919,088, 6 pages.
Notice of Allowance mailed May 23, 2014 from U.S. Appl. No. 13/919,088, 7 pages.
Response filed Aug. 25, 2014 from U.S. Appl. No. 13/919,088, 7 pages.
Notice of Allowance mailed Sep. 9, 2014 from U.S. Appl. No. 13/919,088, 9 pages.
Notice of Allowance mailed Feb. 20, 2013 from U.S. Appl. No. 12/971,191, 10 pages.
Amendment in Response to Notice of Allowance filed May 20, 2013 from U.S. Appl. No. 12/971,191, 10 pages.
Notice of Allowance mailed Mar. 4, 2014 from U.S. Appl. No. 12/253,854, 18 pages.
Response filed Mar. 21, 2012 to Final Office Action dated Dec. 21, 2011 from U.S. Appl. No. 12/253,854, 11 pages.
Applicant Summary of Interview with Examiner filed Mar. 21, 2012 from U.S. Appl. No. 12/253,854, 2 pages.
Applicant Initiated Interview Summary mailed Dec. 30, 2011 from U.S. Appl. No. 12/253,854, 3 pages.
Final Office Action mailed Dec. 21, 2011 from U.S. Appl. No. 12/253,854, 19 pages.
Response filed Dec. 6, 2011 to Non-Final Office Action dated Sep. 7, 2011 from U.S. Appl. No. 12/253,854, 15 pages.
Non-Final Office Action mailed Sep. 7, 2011 from U.S. Appl. No. 12/253,854, 15 pages.
Response filed Jul. 29, 2011 to Restriction Requirement dated Jun. 29, 2011 from U.S. Appl. No. 12/253,854, 3 pages.
Restriction Requirement mailed Jun. 29, 2011 from U.S. Appl. No. 12/253,854, 7 pages.
Herbrich et al., "TrueSkill: A Bayesian Skill Rating System", Jun. 2006, Technical Report, MSR-TR-2006-80, 10 pages.
Herbrich et al., "TrueSkill: A Bayesian Skill Rating System", Advances in Neural Information Processing Systems, 2006, pp. 569-576, 8 pages.
Huang et al., "A Comparison of Collaborative Filtering Recommendation Algorithms for E-commerce," IEEE Computer Society, IEEE Intelligent Systems, 2007, pp. 68-78, 11 pages.
Karamon et al., "Generating Useful Network-based Features for Analyzing Social Networks," Proceedings of the 23rd National Conference on Artificial Intelligence, vol. 2, 2008, pp. 1162-1168, 7 pages.
Kschischang et al., "Factor Graphs and the Sum-Product Algorithm", IEEE Transactions on Information Theory, vol. 47, No. 2, Feb. 2001, pp. 498-519, 22 pages.
Lam et al., "Addressing Cold-Start Problem in Recommendation Systems", Proceedings of the 2nd International Conference on Ubiquitous Information Management and Communication, 2008, pp. 208-211, 4 pages.
Lee et al., "Understanding Collaborative Filitering Parameters for Personalized Recommendations in E-commerce," Electron Commerce Research, vol. 7, Oct. 24, 2007, pp. 293-314, 23 pages.
Lemire et al., "Collaborative Filtering and Inference Rules for Context-Aware Learning Object Recommendation", retrieved on Aug. 22, 2008 at <<http://iit-iti.nrc-cnrc.gc.ca/iit-publications-iti/docs/NRC-48535.pdf>>, Technology and Smart Education, 2(3), Troubador Publishing, Aug. 2005, pp. 179-188, 16 pages.
Leyton-Brown et al., "Empirical Hardness Models: Methodology and a Case Study on Combinatorial Auctions", Journal of the ACM, vol. 56, No. 4, Article 22, Jun. 2009, pp. 1-52, 52 pages.
Li, et al., "Understanding Video Propagation in Online Social Networks," Proceedings of the 2012 IEEE 20th International Workshop on Quality of Service (IWQoS), 2012, Article 21, pp. 1-9, 9 pages.
Lim et al., "Variational Bayesian Approach to Movie Rating Prediction", Proceedings of KDD Cup and Workshop, 2007, pp. 15-21, 7 pages.
Linden et al., "Amazon.com Recommendations, Item-to_item Collaborative Filtering," IEEE Internet Computing, Jan./Feb. 2003, pp. 76-80, 5 pages.
Liu, Yamei, "Overfitting and Forecasting: Linear Versus Non-Linear Time Series Models," Dissertation, Iowa State University, 2000, 118 pages.
Melville et al., "Social Media Analytics: Channeling the Power of the Blogosphere for Marketing Insight," Proceedings of the WIN 1 (1), 2009, pp. 1-5, 5 pages.
Minka, Thomas, "Divergence Measures and Message Passing", Technical Report MSR-TR-2007-173, Microsoft Research Ltd, 2005, 15 pages.
Minka, Thomas P., "Expectation Propagation for Approximate Bayesian Inference," Carnegie Mellon University, 2000, 8 pages.
Minka, Tom, "Bayesian Inference in Dynamic Models—an Overview," Microsoft Research, Mar. 22, 2007, retrieved at <<http://research.microsoft.com/en-us/um/people/minka/papers/dynamic.html>>on Aug. 31, 2011, 6 pages.
Netflix Cinematch, ITI 200 Recommender Systems, retrieved on Aug. 22, 2008 at <<http://beelan515-yahoo-com.wikidot.com/netflix-cinematch>>, 2 pages.
Park et al., "Applying Collaborative Filtering Techniques to Movie Search for Better Ranking and Browsing," ACM KDD'07, Aug. 12-15, 2007, pp. 550-559, 10 pages.
Pulina et al., "A Self-Adaptive Multi-Engine Solver for Quantified Boolean Formulas", retrieved on Oct. 13, 2009 at <<http://cat.inist.

(56) References Cited

OTHER PUBLICATIONS fr/?aModele=afficheN&cpsidt=21207737>>, Springer, Heidelberg, Constraints Journal, vol. 14, 2009, pp. 136, 1 page.

Pulina et al., "Time to Learn or Time to Forget? Strengths and Weaknesses of a Self-Adaptive Approach to Reasoning in Quantified Boolean Formula", Conference on Principles and Practice of Constraint Programming (Doctoral Programme), 2008, pp. 66-71, 6 pages.

Ranganathan, Ananth, "Assumed Density Filtering", Nov. 23, 2004, 2 pages.

Resnick et al., "Recommender Systems", Communications of the ACM, vol. 40, No. 3, 1997, pp. 56-58, 3 pages.

Rice, John R., "The Algorithm Selection Problem", Academic Press, Advances in Computers, vol. 15, Jul. 1976, pp. 65-118, 78 pages.

Richardson et al., "Predicting Clicks: Estimating the Click-Through Rate for New Ads," Microsoft Research, ACM, WWW2007, May 8-12, 2007, pp. 521-529, 9 pages.

Salakhutdinov et al., "Restricted Boltzmann Machines for Collaborative Filtering", Proceedings of the 24th Annual International Conference on Machine Learning, 2007, pp. 791-798, 8 pages.

Samulowitz, Horst, "Solving Quantified Boolean Formulas", retrieved on Oct. 13, 2009 at <<o:\docs\MS6\0196US\KH9057. PDF>>, Graduate Department of Computer Science, University of Toronto (Doctoral Thesis), 2008, 173 pages.

Schafer et al., "Recommender systems in E-commerce," Proceedings of the 1st ACM Conference on Electronic Commerce, ACM, 1999, pp. 158-166, 9 pages.

Schonfeld, Erick, "Zuckerberg: We are Building a Web Where the Default is Social," TC Crunch Network, published Apr. 21, 2010, retrieved at http://techcrunch.com/2010/04/21/zuckerbergs-buildin-web-default-social/, 6 pages.

Smith-Miles, Kate A., "Cross-Disciplinary Perspectives on Meta-Learning for Algorithm Selection", retrieved on Oct. 13, 2009 at <<http://delivery.acm.org/10.1145/1460000/1456656/a6-smith-miles.pdf?  key1=1456656&key2=8216145521&coll=GUIDE &dl=GUIDE&CFID=56211554&CFTOKEN=77346948>>, ACM Computing Surveys, vol. 41, No. 1, Article 6, Dec. 2008, pp. 1-25, 25 pages.

\* cited by examiner

INFORMATION PROPAGATION PROBABILITY FOR A SOCIAL NETWORK

RELATED APPLICATION

This application is a continuation of and claims priority to U.S. application Ser. No. 13/919,088, filed on Jun. 17, 2013, entitled "INFORMATION PROPAGATION PROBABILITY FOR A SOCIAL NETWORK" and U.S. application Ser. No. 12/971,191, filed on Dec. 17, 2010, entitled "INFORMATION PROPAGATION PROBABILITY FOR A SOCIAL NETWORK", which are incorporated herein by reference.

BACKGROUND

Many social networking services, such as Internet-based services providing connections between users, allow their users to create context-free connections (e.g., "friending"), and content-based connections between their users (e.g., "reposting"). For example, a user may send a connection request to another user of the social network in order to "connect" such that updates, posts, etc. from each of the connected users can be viewed. In some cases, a user might mention another user in a posted message or a user may re-post information that another user has previously posted. This content-based connection between two people can often be indicative of influence that a first user has on a second user, because the second user may have felt that information posted by the first user was important enough to share with their friends and followers, thereby providing a content-based connection. When a second user propagates (e.g., reposts, forwards, mentions, etc.) some information from a first user, connections to the second user can see the propagated information, which in turn may be propagated by these connections, and so-on, such that a plurality of users in the social network can view at least a portion of the originally posted information.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Being able to predict a type of content-based connection, such as when user's repost and/or mention another user in a post, may be useful to identify potentially influential users, propagations trends, and/or potential reach of information on a social network, for example. Currently, predictive models are often used to identify potential trends in online behaviors. However, predicting a probability that information posted on a social network may be propagated on the social network is not performed.

Accordingly, one or more techniques and/or systems are disclosed where information sharing on social networks can be observed, for example, to determine influential social network users, and/or a potential reach of information in a social network by propagation (e.g., reposting, mentioning). The social network can be observed for positive and negative propagation data, for example, and a graph of potential connections for a given user may be developed by scanning shared messages between users over a given time-frame. A training set of positive and negative connections can be developed based on the potential connections for a given user, and a predictive model can be trained over the training set to identify propagation probability for a given user message, for example.

In one embodiment for predicting propagation of a message on a social network, a predictive model can be trained to determine a probability of propagation of information on the social network using both positive and negative information propagation feedback, such as from monitoring the social network over a desired period of time. Further, the predictive model can be used to determine a probability of propagation of the message on the social network, such as how many connections may receive at least a portion of the message and/or a likelihood of at least a portion of the message reaching respective connections in the social network.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
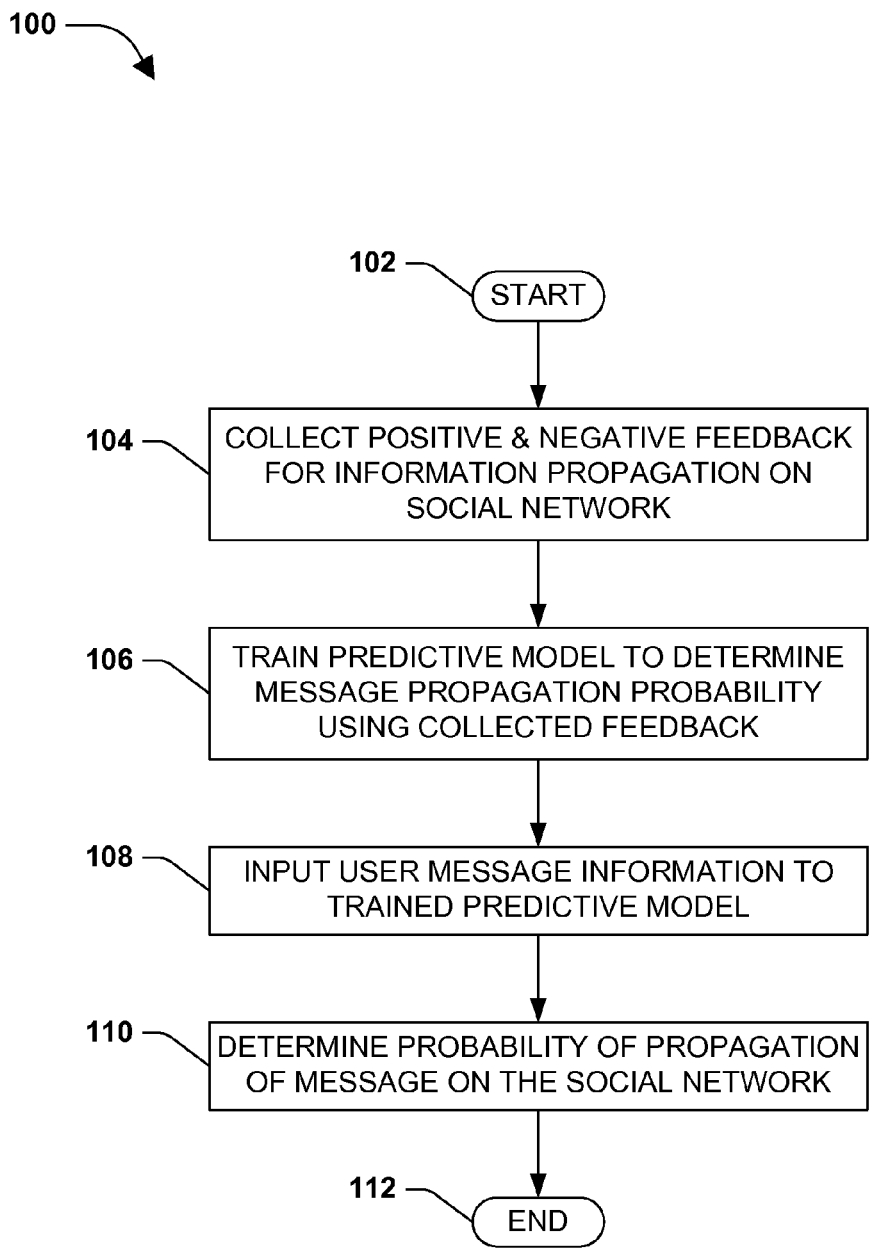
FIG. 1 is a flow diagram of an exemplary method for predicting propagation of a message on a social network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that can provide improvements in message propagation (e.g., re-posting of a user's message by another user, or forwarding a message) on social networks. Historical message propagation can be monitored on a social network, for example, to identify trends in message propagation, such as those relating to the message author, propagator, content of the message, and timing of the message. The historical message propagation information can be used to train a predictive model, and the trained model can be used to determine propagation probabilities for a current message, for example. Further, message adjustments may be determined for the current message, for example, that may improve potential propagation, such as content and/or timing adjustments.

FIG. 1 is a flow diagram of an exemplary method 100 for predicting propagation of a message on a social network. The exemplary method 100 begins at 102 and involves collecting data on positive and negative feedback for information that is propagated on the social network, at 104. For example, a user of a social network can post a message to the social network (e.g., write a comment, send a message to one or more contacts, upload information to the social network), which can be picked up (e.g., read or opened) by one or more contacts of the user on the social network.

Further, the one or more contacts of the user can propagate the message to their contacts (e.g., forward or repost at least a portion of the message, and/or a link to at least a portion of the message, such as a document), which may comprise other users that are not contacts of the message author, for example. In one embodiment, positive feedback may come from message propagation, and negative feedback may come from when a message is not propagated (e.g., no forwarding or reposting).

At 106 in the exemplary method 100, a predictive model is trained with the collected feedback to determine message propagation probability. For example, a predictive model can be created or identified for use based on a desired prediction of probability of an outcome. A predictive model may utilize one or more classifiers to determine a probability, given the input information, of one or more outcomes. Some classifiers that may be utilized include, but are not limited to, a Naïve Bayes classifier, support vector machine (SVM) or other linear classifier, logistic regression classifier, k-nearest neighbor classifier, or some model that learns probability distributions for input variables, for example, and even an uplift modeling classifier for predictive modeling of message alternatives.

In one embodiment, the predictive model can be trained over data collected from monitoring the social network for positive and negative feedback. For example, a predictive model, such as comprising one or more classifiers, can be trained over a training set. The training set can provide information to the model that allows it to predict a probable outcome for a particular input. For example, the social network may be monitored for a period of time, during which a plurality of user messages are posted to the network and a plurality of user message propagations are undertaken, or not, by connections to the users posting the messages. The metadata associated with user message posting and propagation or non-propagation can be used as a training set for the predictive model.

At 108 in the exemplary method 100, user message information, such as the author, content, timing, and/or the user contacts, can be input to the trained predictive model, and at 110, the trained predictive model can be used to determine a probability of propagation of the message on the social network. That is, for example, a user may create a message, which may comprise text, media, a document, a link, data, code, and/or a combination of any of these and/or any other content, for posting to the social network. In this embodiment, the message can be input to the trained predictive model, along with an expected time for posting, and/or information related to the user's connections on the social network. In this embodiment, the trained predictive model can determine a probability that the message will be propagated on the social network, such as by how many connections, a probability of reaching all potential connections to the user (e.g., including connections of connections), and/or other probabilities related to message propagation on the social network.

Having determined the probability of propagation of the message on the social network, the exemplary method 100 ends at 112.

Figure 2:
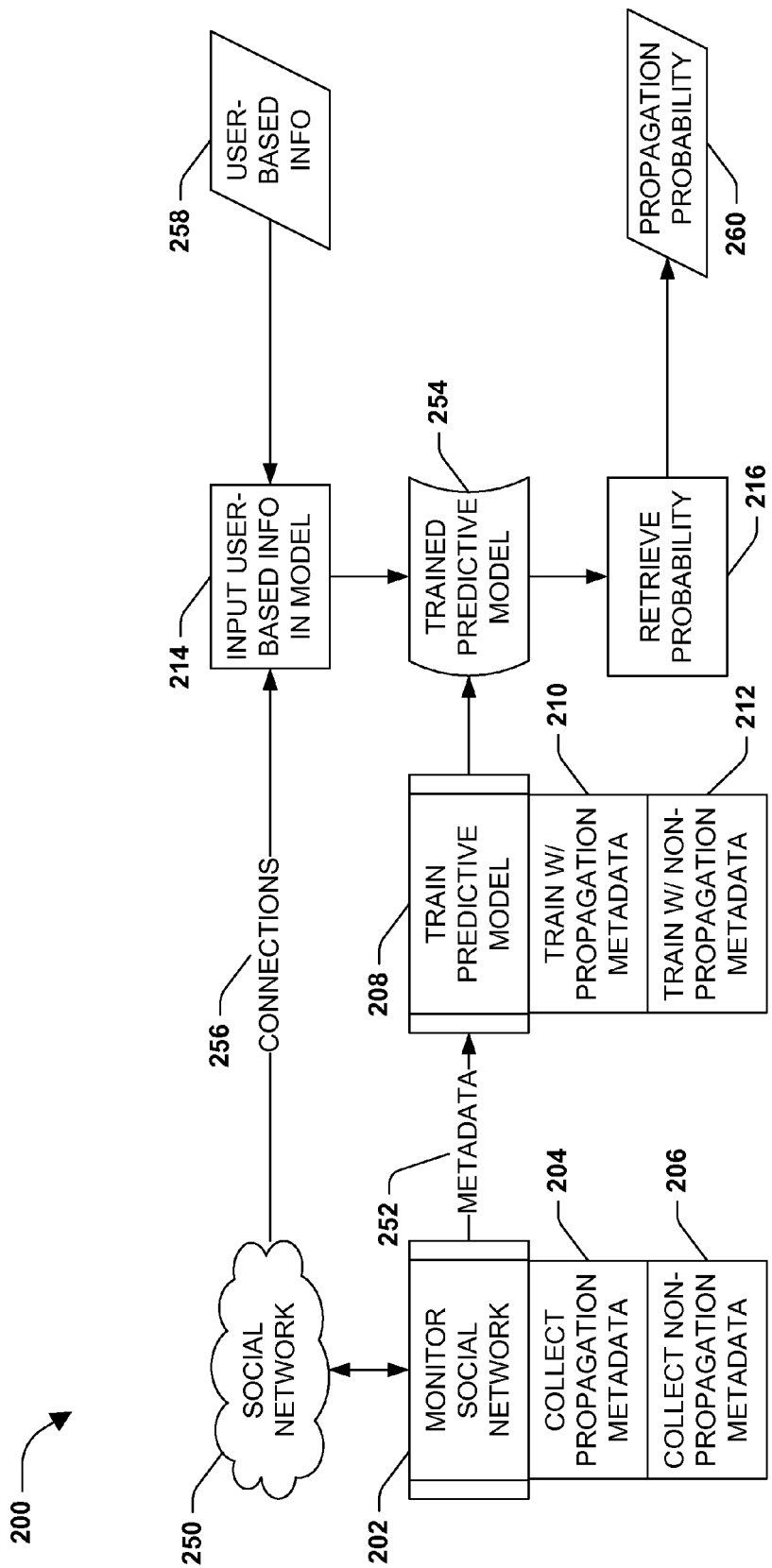
FIG. 2 is a flow diagram illustrating an example embodiment where one or more techniques described herein may be implemented.

FIG. 2 is a flow diagram illustrating an example embodiment 200 where one or more techniques described herein may be implemented. At 202, a social network 250 can be monitored for positive and negative information propagation feedback by users of the social network 250. Monitoring the social network 250 can comprise collecting propagation metadata 252, at 204, that is associated with the positive information propagation feedback on the social network 250.

Positive information propagation feedback can comprise information associated with a propagation of a message (e.g., forwarding, reposting, etc.) from an author by one or more connections to the author of the message. For example, when an author of the message posts the message to their social network (e.g., using a status update, micro-blogging statement, comment on an existing post, linking or indicating approval or disproval of an existing item, etc.) one or more connections to the author (e.g., depending on settings associated with the author's post and/or social network settings) may receive a notice of the post. In this example, a connection to the author that receives the notice of the post can repost or forward at least a portion of the message to one or more of their connections in the social network (e.g., and so-on, such as a connection to the connection reposting).

In one embodiment, the collected propagation metadata can comprise an identity of an originator of propagated information (e.g., the author). For example, the identity may comprise a username, an IP address of the client machine used for the posting, or some other identification that links the author to the posted information (e.g., message). Further, the collected propagation metadata can comprise an identity of a propagator of the propagated information. For example, each time at least a portion of the original information is reposted an identity of the reposter can be collected.

Additionally, the collected propagation metadata can comprise content of the propagated information. For example, the posted information may comprise an overall relational theme, such as "entertainment" related (e.g., celebrities, movies, music, etc.), "technical field" related (e.g., a technology review, sports-related, computer-related, political, etc.), etc., which may be identified and associated with the original posted message. As another example, key-words may be identified in the content of the propagated information and associated with the original posted message.

The collected propagation metadata may also comprise a time period associated with the propagation of the propagated information. For example, a time that the original message can be identified, along with times for respective repostings of the message. In this embodiment, the metadata associated with propagation of the message posted by a user can be considered as positive metadata.

In one embodiment, the monitoring can comprise collecting non-propagation metadata 252, at 206, which is associated with negative information propagation feedback on the social network 250. For example, when a message posted by a user is not propagated (e.g., reposted) by any of the user's connections the message can be linked to negative information propagation (e.g., no propagation). The non-propagation metadata can comprise an identity of an originator of non-propagated information, and/or an identity of a non-propagator of the non-propagated information. For example, as described above, the identity of the message poster (e.g., author, user), and the identity of the respective connections to the message poster that did not propagate the message can comprise negative information propagation feedback.

Further, as described above, the non-propagation metadata can comprise content of the non-propagated information, and/or a time period associated with the non-propagation of the non-propagated information. As an example, a theme/topic of the posted, non-propagated information, and/or keywords in the posted, non-propagated information can be identified. Also, in this example, the time at which the non-propagated message was initially posted can be identified for the non-propagation metadata.

In one aspect, the monitoring of propagation of information, such as user posted messages, on the social network can comprise monitoring respective users that propagate information. As an illustrative example, the social network can be monitored for propagation activity, and when a message is propagated, the identity of the propagator, along with other positive propagation metadata, can be collected. Further, in this embodiment, the propagator can be monitored to determine when they do not propagate a message from the same (or another) author, in order to collect negative propagation metadata. In this way, in one embodiment, merely those users that propagate messages can be monitored to collect the negative and positive metadata for training the predictive model, for example.

At 208 in the example embodiment 200, the predictive model can be trained to determine the probability of propagation of the message on the social network. Training the predictive model can comprise using the metadata 252 collected from monitoring of the social network 250, for example, as a training set to train the predictive model. In one embodiment, the predictive model can be trained with the metadata associated propagation of information on the social network, such as the propagation metadata associated with the positive information propagation feedback on the social network 250, at 210. Further, in one embodiment, the predictive model can be trained with metadata associated with non-propagation of information on the social network, such as the non-propagation metadata associated with the negative information propagation feedback on the social network 250, at 212.

As an example, training a predictive model can comprise running one or more classifiers over a training set comprising typical input data and output results. In this example, the predictive model can learn from the examples in the training set, such that when non-training data is input to the predictive model the resulting output comprises a prediction of probability that the input data would result in the output (e.g., using a percentage probability, a range of values, or most likely value for the input). In one embodiment, while the training can result in a trained predictive model 254, the trained predictive model 254 may be updated periodically or continually using collected metadata from a subsequent (or continuous) monitoring of the social network for propagation information.

At 214 in the example embodiment 200, user-based information 258 can be input into the trained predictive model 254 to determine the probability of propagation of the message on the social network. The user-based information 258 can comprise a content of the message posted by the user (e.g., author of the originally posted message subject to propagation) to the social network 250. For example, the content of the user message can comprise a particular theme/topic, and/or keywords that may be used to determine a probability of propagation.

Further, the user-based information 258 input to the trained predictive model 254 can comprise a desired time period of propagation. For example, the user/author may wish to post the message immediately, for which the time can be identified, or at a later desired time, which may be provided by the user. The time period may also be used to determine a probability of propagation for the message, for example.

In one embodiment, the user-based information 258 input to the trained predictive model can comprise user connections 256 on the social network 250. For example, the user/author's social network connections may correspond to propagators (or not) that were identified during the monitoring of the social network. In this example, a connection that tends to propagate information (e.g., or have propagation tendencies based on time and/or content) may influence the determining of a probability of propagation of the message (e.g., as would a connection that tends to be a non-propagator). Additionally, connections of the user/author's connections (e.g., and so on) can be identified and provided as user-based information input to the trained predictive model to facilitate in determining a probability of propagation for the message.

At 216 in the example embodiment 200, the probability of propagation 260 of the message on the social network 250 can be retrieved from the trained predictive model 254. In one embodiment, the probability of propagation 260 can comprise a total number of connections predicted to receive the message posted by the user. For example, based on the user-based information 258 input, the trained predictive model 254 may determine that X number of connections (e.g., connected to the user in the social network, comprising connections to the user's connections, etc.) are likely to receive the message through propagation. As an illustrative example, if the user has only five connections, and each one reposts the message, and each of the five connections has five connections who do not repost, the message will be received by thirty connections (e.g., the five user connections plus the twenty-five other connections).

In another embodiment, the probability of propagation 260 can comprise a number of connections receiving the message over a desired time period. For example, the trained predictive model may determine that over a next Y period of time, X number of connections will receive the message (e.g., sixty connections in the first hour; two-hundred in two hours, one-thousand in a week, etc.).

As an illustrative example, messages posted by the user/author are not typically viewed by all their connections at a same time, but over a period of time (e.g., as connections access the social network and view updates, receive emails, receive texts, receive phone calls, etc.). In this example, various connections can receive the message and decide to propagate the message (or not) over the period of time, and their connections may then receive the propagated message and decide to propagate (or not) the message, and so-on. In this embodiment, the desired time period for the retrieved probability may be set by the user, or may be set automatically (e.g., programmatically) to achieve a desired result.

In another embodiment, the probability of propagation 260 can comprise a probability of respective connections on the social network receiving the message. For example, a potential reach of the message posted by the user on the social network may be predicted as a probability of propagation. As an illustrative example, a likelihood of propagation of a certain type of message at and/or within a certain time can be determined for respective connections in the social network (e.g., comprising those in the network with some connection to the user/author that have propagated information during the monitoring of the social network). In this example, using the likelihood of propagation the trained predictive model can determine a probability that the message will be propagated to respective connections to the user (e.g., by combining a likelihood of propagation value for respective levels of connection to the user).

Figure 3:
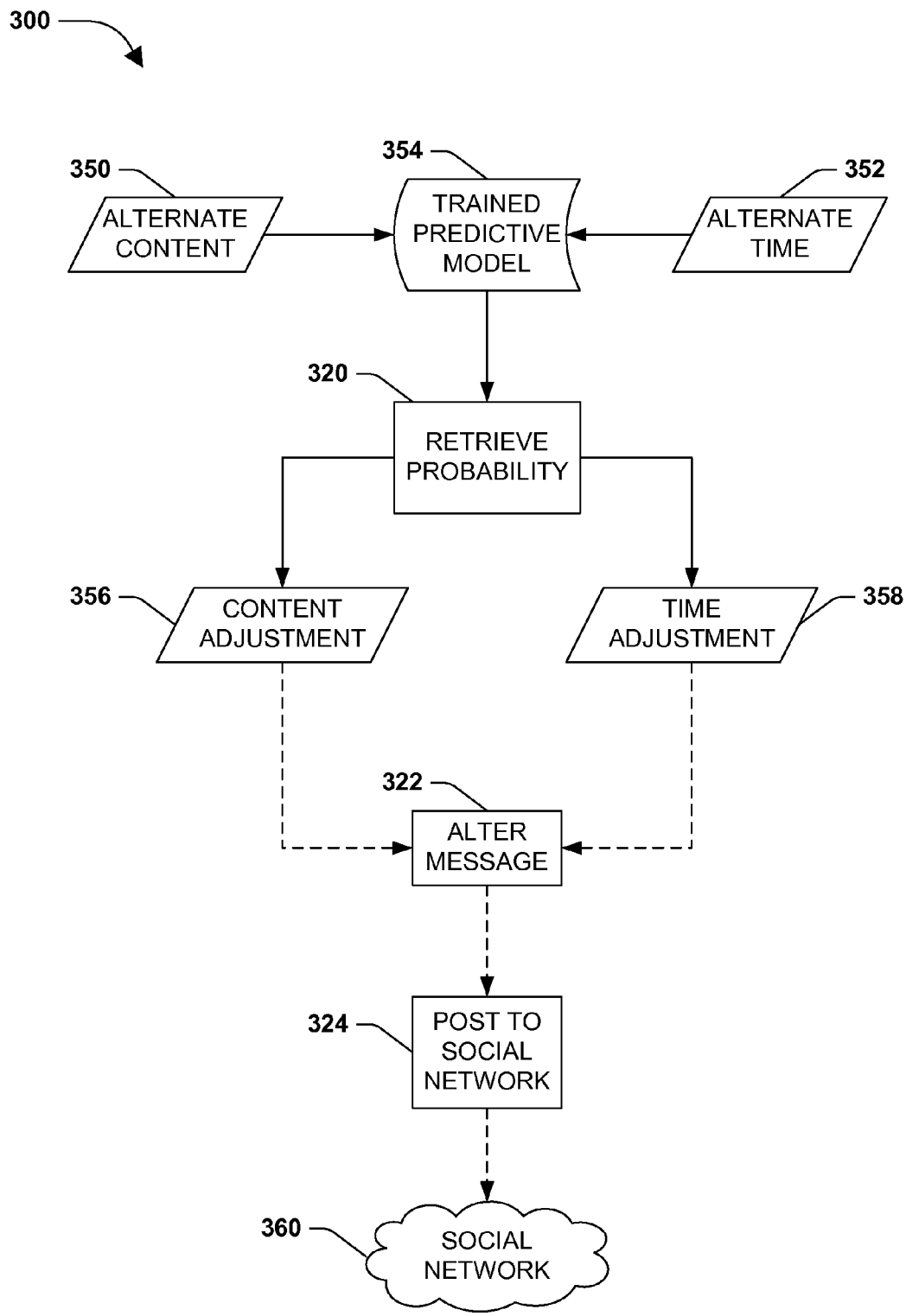
FIG. 3 is a flow diagram illustrating an example embodiment where one or more techniques described herein may be implemented.

FIG. 3 is a flow diagram illustrating another example embodiment 300 where one or more techniques described herein may be implemented. In this example embodiment 300, message adjustment information may be determined for a message using a trained predictive model 354. In this embodiment, the message adjustment information can be applied to the message to change the probability of propagation of the message on the social network. For example, a content adjustment, and/or a timing adjustment may change the probability of propagation (e.g., higher or lower).

Alternate message content 350 and/or alternate timing information 352 may be identified and input to the trained predictive model 354 to determine an alternate probability of propagation. For example, alternate content 350 and alternate timing for posting the message may be identified during the training of the predictive model, such as from metadata in the training set. At 320, probabilities for respective combinations of alternate content 350 and/or alternate timing data 352 can be retrieved from the trained predictive model 354.

In this way, for example, when the user-based information for the user message is run through the trained predictive model (e.g., 214-216 of FIG. 2) content adjustment information 356 (e.g., suggestions for adjusting a theme/topic and/or keywords) and/or time adjustment information 358 (e.g., suggestions for posting the message at an alternate time) can be provided. As an illustrative example, the user may wish to post a message comprising a computer-gaming theme immediately. In this example, based on the retrieved probabilities of combinations of alternate content and/or timing information, particular keywords may be provided that could increase a probability of propagation of the message (e.g., reach more connections). Further, in this example, an alternate time for posting the message (e.g., at lunch-time when more people check there social networks) may be provided that could increase a likelihood of propagation (e.g., more connections within the hour).

At 322 in the example embodiment 300, the message can be altered to comprise some or all of the provided adjustments (e.g., at least some of the content adjustments and/or at least some of the time adjustments), for example, either by the user or automatically (e.g., programmatically based on some preset criteria). At 324, the altered message can be posted to the social network 360 at a desired time (e.g., immediately or at a suggested alternate time) either by the user or automatically.

Figure 4:
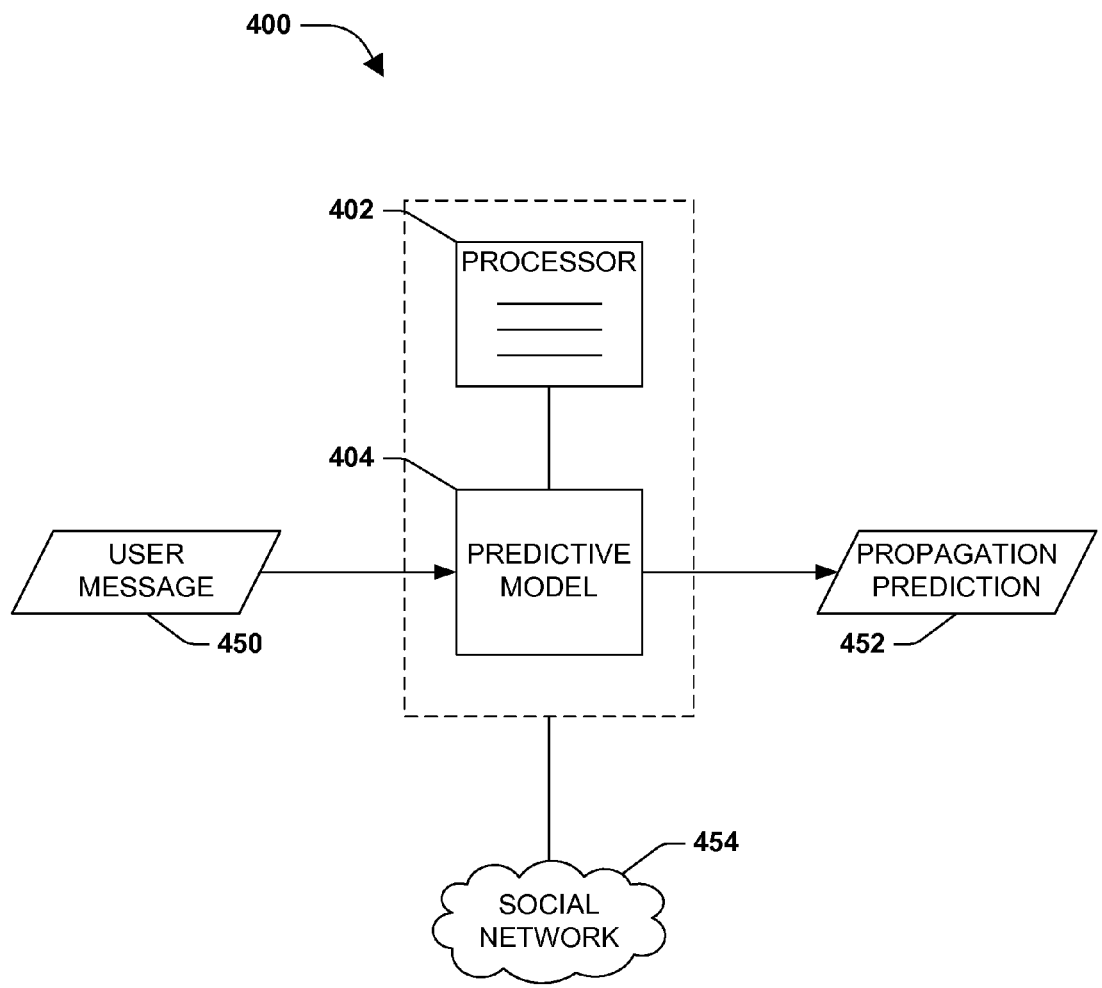
FIG. 4 is a component diagram of an exemplary system for predicting propagation of a message on a social network.

A system can be devised for predicting propagation of information on a social network, for example, and for using the predictions to improve propagation of a message. FIG. 4 is a component diagram of an exemplary system 400 for predicting propagation of a message on a social network. A computer-based processor 402 is configured to process data for the system. The computer-based processor 402 is operably coupled with a predictive model component 404 that is trained to determine a probability of propagation of information on the social network 454. The predictive model component is trained using both positive and negative information propagation feedback from the social network 454 and configured to determine a probability of propagation 452 of the message 450 (e.g., user message) on the social network 454.

Figure 5:
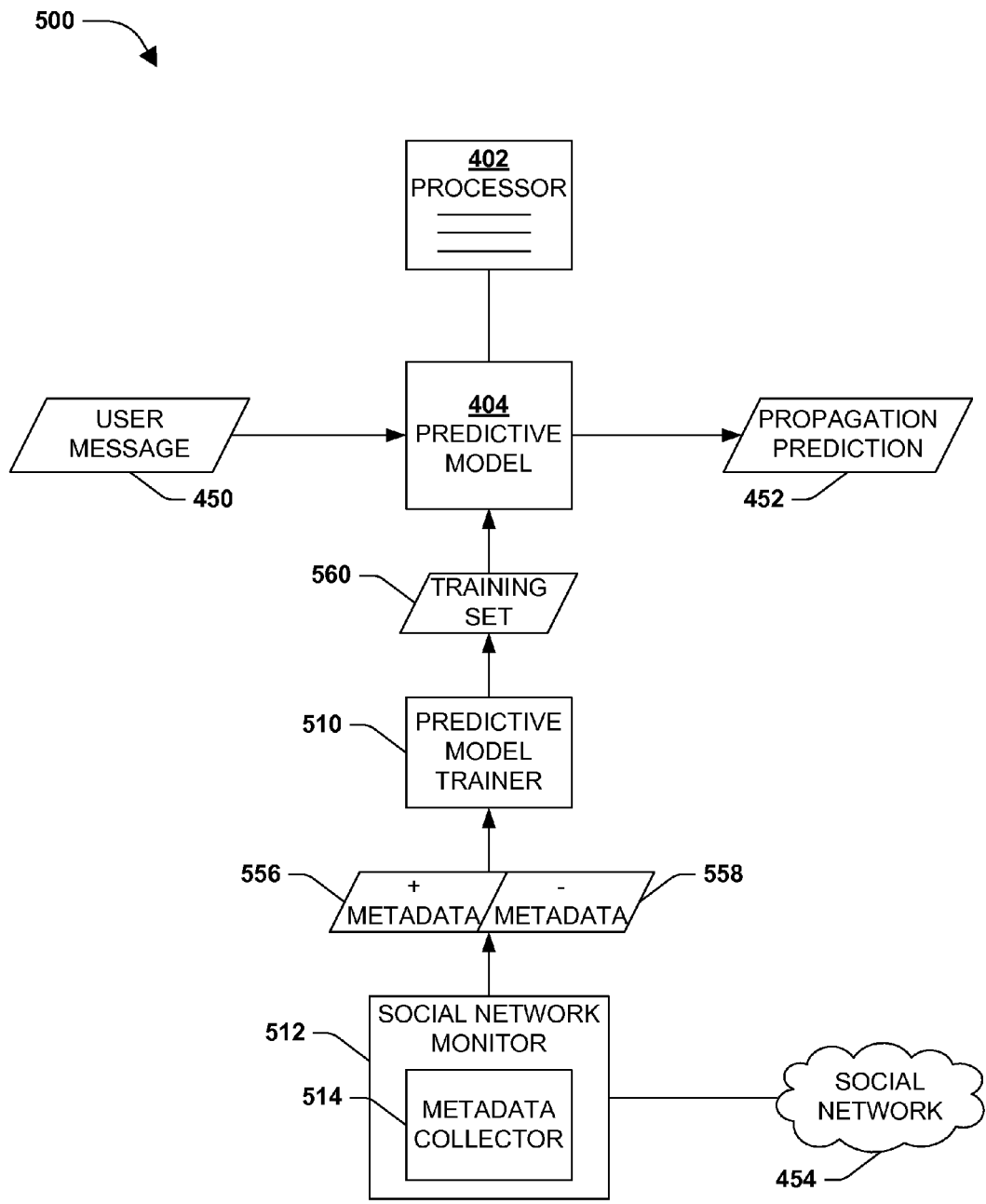
FIG. 5 is a component diagram illustrating an example embodiment where one or more systems described herein may be implemented.

FIG. 5 is a component diagram illustrating an example embodiment 500 where one or more systems described herein may be implemented. A social network monitoring component 512 can monitor the social network 454 for positive and negative propagation information to use for training the predictive model 404. For example, positive propagation information can comprise information related to a propagation of a message on the social network, such as when a connection to a user forwards or reposts at least a portion of a message posted by the user. Further, in this example, negative propagation information can comprise information related to a non-propagation of a message, such as when a connection does not forward the user's message (e.g., but where the connection has previously propagated a message).

The social network monitoring component 512 can comprise a metadata collection component 514 that collects positive and negative information propagation metadata 556, 558 for use in a training set 560 used to train the predictive model. A predictive model training component 510 can train the predictive model 404, using both positive and negative information propagation feedback (e.g., metadata 556, 558) from the social network, to determine a probability of propagation 452 of information on the social network 554.

The positive information propagation metadata 556 can comprise information that is related to propagation of a user message on the social network 554 (e.g., forwarding or reposting the user message). In one embodiment, the information related to propagation of a user message can comprise an identity of the user that authored/originated the message; an identity of a connection to the user that propagated the message; content of the message; and/or a time period associated with the propagation of the message, etc.

The negative information propagation metadata 558 comprising information that is related to non-propagation (e.g., not forwarding, or ignoring) of a user message on the social network 554. In one embodiment, the information related to non-propagation of a user message can comprise an identity of the user authoring the message; an identity of a connection to the user that did not propagate the message (e.g., but may have previously propagated a message); content of the message; and/or a time period associated with the non-propagation of the message, etc.

In one embodiment, the positive and negative information propagation feedback from the social network 554 is collected from a plurality of connections to a user of the social network, where the respective connections have propagated at least one message on the social network 554. For example, when a connection on the social network propagates a message on the social network, that connection can be monitored for information relating to subsequent propagation (or non-propagation) of information, such as from a particular user. In this way, for example, information related to message propagation can be collected for a plurality of users and their respective connections (e.g., including all connections downstream). In one embodiment, this collected information can be used in the training set 560 to train the predictive model to predict propagation 452 for a user message 450.

Figure 6:
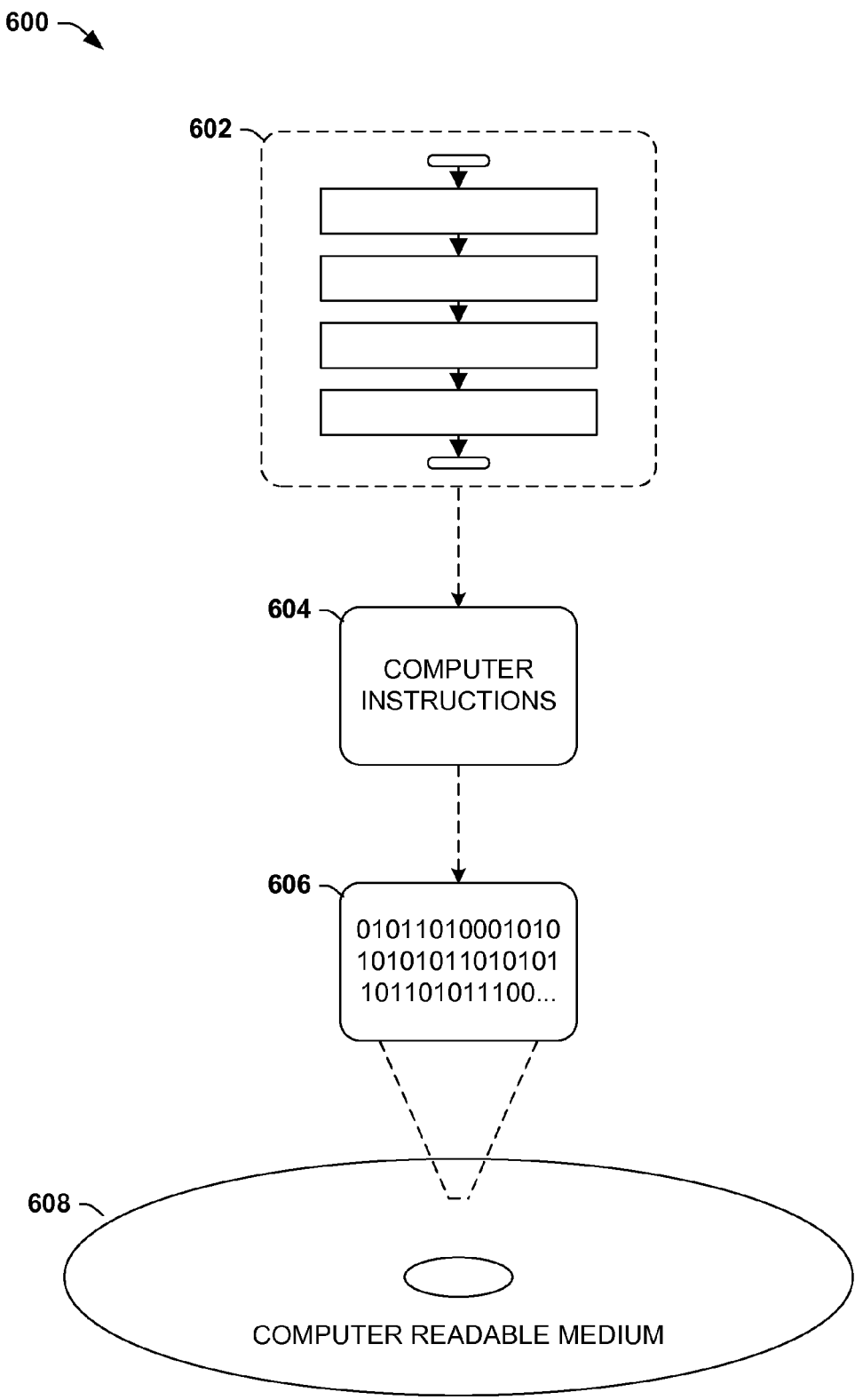
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary method 100 of FIG. 1, for example. In another such embodiment, the processor-executable instructions 604 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
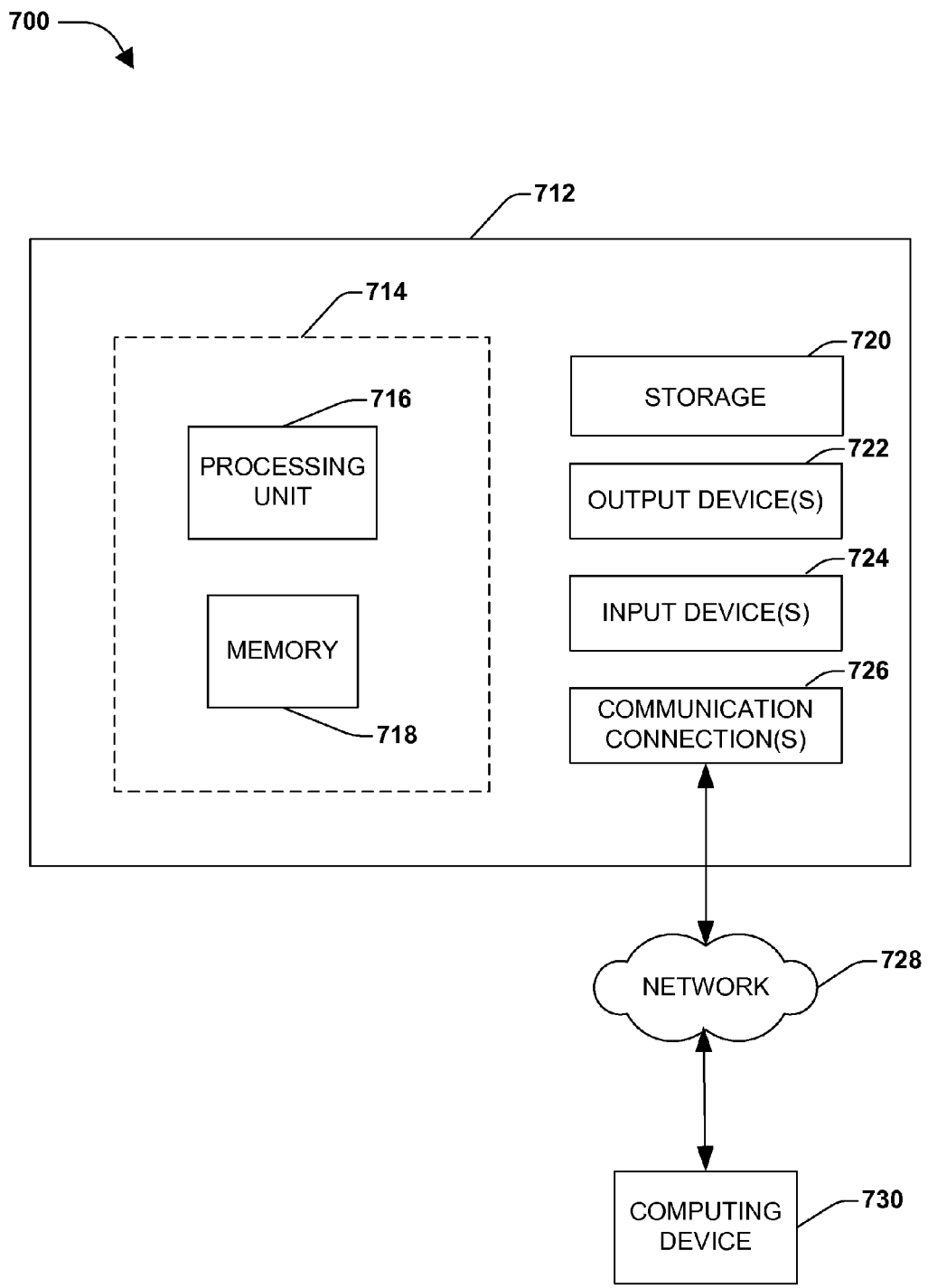
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method performed using at least one computer-based processor, the method comprising:
    monitoring one or more messages on a social network for information propagation feedback, the monitoring comprising collecting propagation metadata and non-propagation metadata;
    training a predictive model using the propagation metadata and the non-propagation metadata as a training set;
    determining a probability of propagation of an input message on the social network using the predictive model;
    retrieving one or more other probabilities for one or more of alternate content for the input message or an alternate time for posting the input message to the social network; and
    determining message adjustment information for the input message based at least upon the probability of propagation and the one or more other probabilities, the message adjustment information comprising one or more of a content adjustment for the input message or a timing adjustment for the posting of the input message, wherein the message adjustment information causes the input message to have an increased probability of propagation on the social network.

2. The method of claim 1, comprising collecting an indication of a propagation of a first message of a first user by a second user as at least part of the propagation metadata.

3. The method of claim 1, comprising collecting an indication of a lack of propagation of a first message of a first user by a second user as at least part of the non-propagation metadata.

4. The method of claim 1, comprising collecting an indication of a lack of propagation of a first message of a first user by any connections of the first user as at least part of the non-propagation metadata.

5. The method of claim 1, wherein the non-propagation metadata is associated with negative feedback instances where users of the social network did not propagate individual messages over the social network using a wired or wireless electronic communication network.

6. The method of claim 5, wherein the propagation metadata is associated with positive feedback instances where the users of the social network did propagate other individual messages over the social network using a wired or wireless electronic communication network.

7. The method of claim 6, wherein the positive feedback instances involve the users forwarding or reposting the other individual messages to other users.

8. A system, comprising:
    one or more processing units; and
    memory comprising instructions that, when executed by at least one of the one or more processing units, cause the at least one of the one or more processing units to:
    monitor messages communicated over a wired or wireless electronic network to determine whether the messages are propagated among various computing devices, the messages being monitored by collecting propagation metadata for instances where individual messages are propagated and non-propagation metadata for other instances where other individual messages are not propagated;
    train a predictive model using the propagation metadata and the non-propagation metadata as a training set; and
    determine a probability of propagation of an input message on the wired or wireless electronic network using the predictive model.

9. The system of claim 8, wherein the instructions, when executed by the at least one of the one or more processing units, cause the at least one of the one or more processing units to:
   determine message adjustment information for the input message based on the probability of propagation, the message adjustment information comprising one or more of a content adjustment for the input message or a timing adjustment for the input message.

10. The system of claim 8, wherein users of the various computing devices communicate the messages over a social network and the probability of propagation reflects the likelihood that an individual user of the social network will share the input message with at least one other user of the social network.

11. The system of claim 10, wherein the messages are communicated among the various computing devices over the wired or wireless electronic network using Internet Protocol.

12. The system of claim 11, wherein the propagation metadata identifies Internet Protocol addresses of individual computing devices that are used to propagate the individual messages.

13. The system of claim 8, wherein the predictive model is a Bayesian classifier, a support vector machine, a regression classifier, or a nearest-neighbor classifier.

14. The system of claim 8, wherein the propagation metadata identifies themes, topics, or keywords of the individual messages that are propagated, the non-propagation metadata identifies themes, topics, or keywords of the other individual messages that are not propagated, and the probability of propagation is determined by inputting a theme, topic, or keyword of the input message to the predictive model.

15. A method performed using at least one computer-based processor, the method comprising:
   monitoring messages communicated among various computing devices over a computer network using Internet Protocol to determine whether messages are propagated among the various computing devices, the monitoring comprising collecting propagation metadata for instances where individual messages are propagated;
   training a predictive model using the propagation metadata; and
   predicting propagation of an input message using the predictive model.

16. The method of claim 15, further comprising:
   collecting non-propagation metadata for other instances where other individual messages are not propagated; and
   training the predictive model using the non-propagation metadata.

17. The method of claim 15, wherein the messages and the input message are communicated using a social network.

18. The method of claim 15, wherein the predicting comprises determining a probability that the input message will be propagated.

19. The method of claim 15, wherein the predicting comprises estimating a number of users that will receive the input message.

20. The method of claim 15, wherein the training comprises training the predictive model using content of the individual messages that are propagated and the predicting comprises inputting content of the input message to the predictive model.

\* \* \* \* \*